(12) United States Patent
Rettger, II

(10) Patent No.: US 9,010,021 B1
(45) Date of Patent: Apr. 21, 2015

(54) ADJUSTABLE WATER RETENTION DEVICE FOR A PLANT POT

(71) Applicant: Robert E. Rettger, II, Glen Ellyn, IL (US)

(72) Inventor: Robert E. Rettger, II, Glen Ellyn, IL (US)

( * ) Notice: Subject to any disclaimer, the term of this patent is extended or adjusted under 35 U.S.C. 154(b) by 114 days.

(21) Appl. No.: 13/761,317

(22) Filed: Feb. 7, 2013

(51) Int. Cl.
*A01G 27/02* (2006.01)
*A01G 27/06* (2006.01)
*A01G 27/00* (2006.01)
*A01G 9/02* (2006.01)

(52) U.S. Cl.
CPC . *A01G 27/00* (2013.01); *A01G 9/02* (2013.01)

(58) Field of Classification Search
USPC ................................................ 47/66.1, 79–82
See application file for complete search history.

(56) References Cited

U.S. PATENT DOCUMENTS

| | | | |
|---|---|---|---|
| 2,885,825 A * | 5/1959 | Longacre | 47/79 |
| 3,775,904 A | 12/1973 | Peters | |
| 3,783,555 A | 1/1974 | Peters | |
| 3,800,471 A | 4/1974 | Adams | |
| 4,001,967 A | 1/1977 | Swift et al. | |
| 4,142,324 A | 3/1979 | Magyar, Jr. | |
| 4,167,080 A * | 9/1979 | Mickelson | 47/71 |
| 4,265,050 A * | 5/1981 | Buescher | 47/79 |
| 4,885,870 A * | 12/1989 | Fong | 47/79 |
| 5,044,120 A | 9/1991 | Couch | |
| 5,852,896 A * | 12/1998 | Flasch, Jr. | 47/79 |
| 6,134,832 A | 10/2000 | Bokmiller et al. | |
| 6,223,466 B1 | 5/2001 | Billings | |
| 6,345,470 B1 * | 2/2002 | Slaght et al. | 47/79 |
| 6,505,440 B1 * | 1/2003 | Lai | 47/79 |
| 6,637,156 B2 * | 10/2003 | Stewart | 47/82 |
| 7,690,151 B2 | 4/2010 | Wilkes | |
| 2006/0037241 A1 | 2/2006 | Orschulik | |
| 2013/0133255 A1 * | 5/2013 | Wu | 47/66.1 |

FOREIGN PATENT DOCUMENTS

GB      2482384 A      1/2012

* cited by examiner

*Primary Examiner* — Kristen C Hayes
(74) *Attorney, Agent, or Firm* — Mathew R. P. Perrone, Jr.

(57) ABSTRACT

An adjustable water retention device for a plant pot has a plant container nesting in a second outer pot, with a facilitated flow of water communicating between the second outer pot and the plant container, wherein the second outer pot rests on a base.

17 Claims, 10 Drawing Sheets

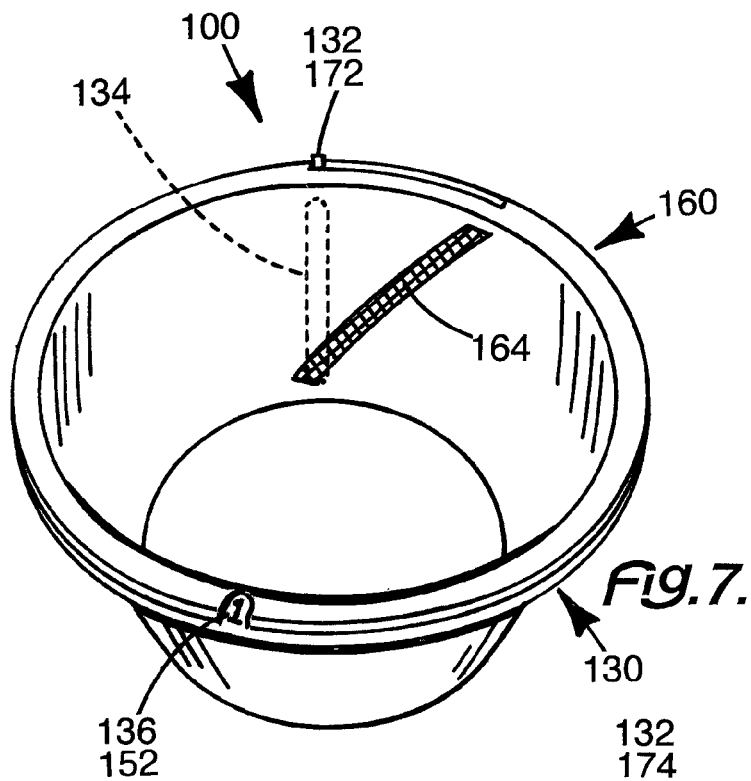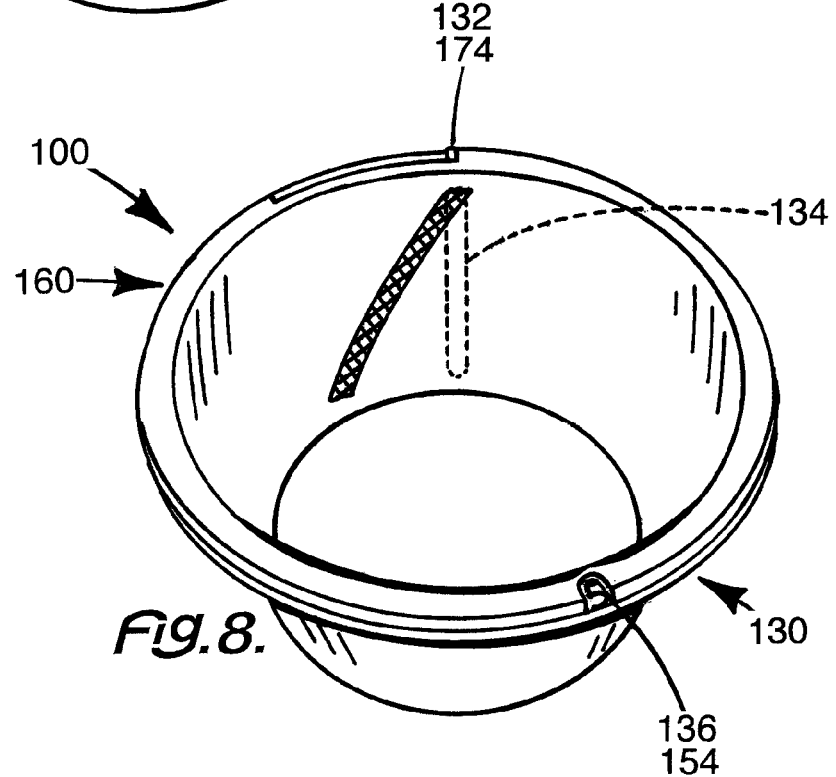

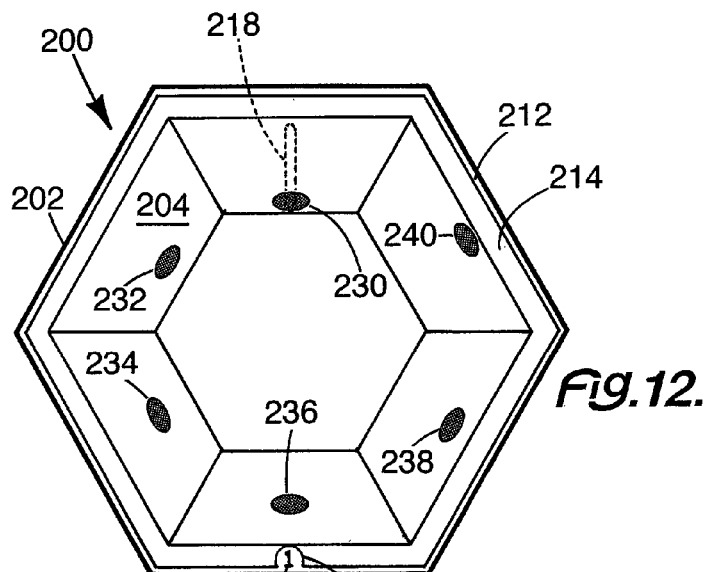
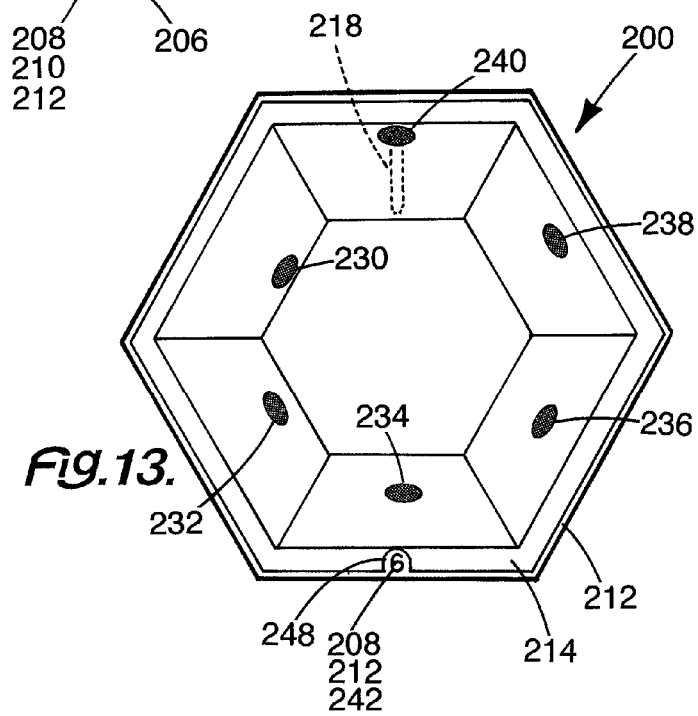

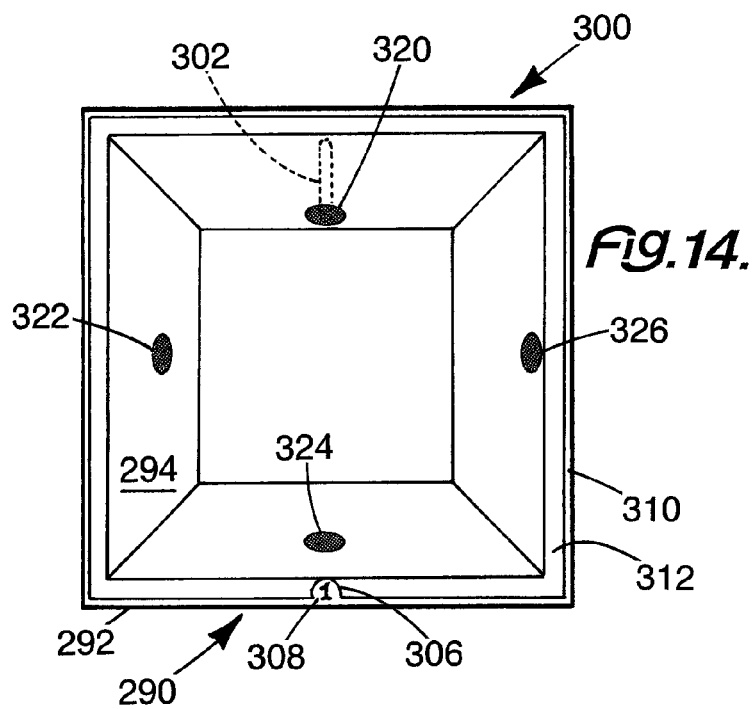
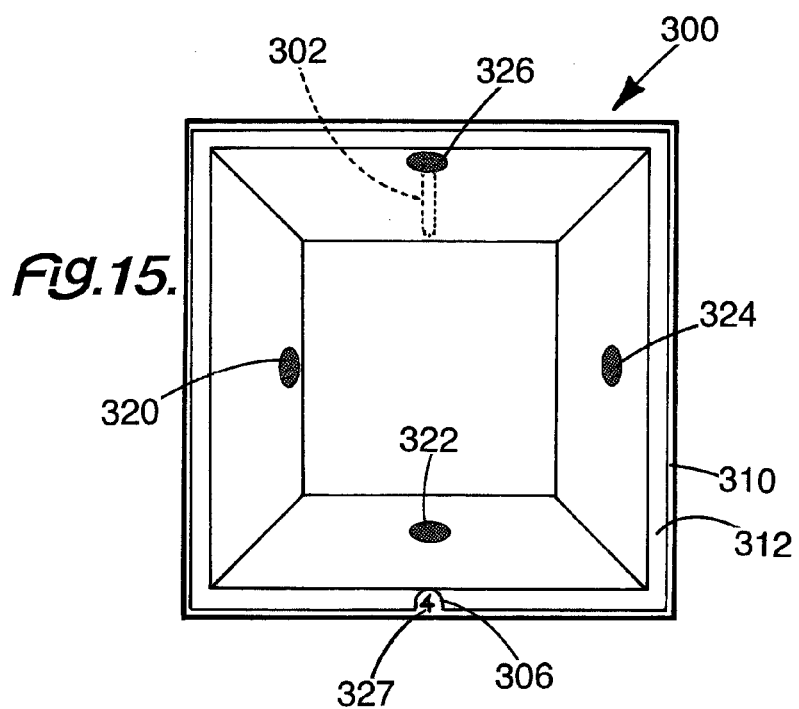

ADJUSTABLE WATER RETENTION DEVICE FOR A PLANT POT

This invention relates to a plant pot and more particularly to an adjustable water retention device for a plant pot having a water device to provide an adjustable and controllable water flow to soil in the plant pot.

BACKGROUND OF THE INVENTION

For a building, many times it is very desirable to have plants within the building itself. Such plants may be aesthetically pleasing as well as environmentally friendly. The plants can improve the oxygen content of the air in a building, as well provide something attractive to view.

These plants are usually contained in a plant pot. Within the plant pot, is soil suitable for growing plants, such as flowers or other desired vegetation. Plants, even those kept inside, require water and sunlight. To that end, many ways are known to provide those requirements.

Water must be applied to the plant pot in a proper amount, at a proper time, and at a desired level in the soil of the plant pot. With proper watering, the plant or vegetation in the plant pot can thrive. Such thriving plants can improve the air quality and general overall aesthetic desirability of the building in which they are located.

Proper watering of plants can be time-consuming. A regimented schedule of watering combined with desired amounts of water is required. Such control can be problematic. Within a building, it is desired to keep water contained in a very limited area. The water cannot splash outside the container for the plant, without causing a problem in the building. Such a problem can range from a minor stain to structural damage to the building.

By containing the water for the plant within a desired area, great advantages can be obtained. Not only can water be directed in the desired part of the plant, but the amount of water can be efficiently controlled for maximum benefit to the plant. Such conditions complicate providing a proper amount of water to an indoor plant.

SUMMARY OF THE INVENTION

Among the many objectives of this invention is the provision of an adjustable water retention device for a plant pot having a plant container nesting in a second outer pot.

Another objective of this invention is the provision of an adjustable water retention device for a plant pot, wherein the plant container has a graduated access to water to permit normal watering procedure.

Yet another objective of this invention is the provision of an adjustable water retention device for a plant pot, which controls water flow from a plant container in a controlled graduated manner.

Still another objective of this invention is the provision of an adjustable water retention device for a plant pot, wherein the second outer pot provides communication of water therefrom out of the plant pot.

A further objective of this invention is the provision of an adjustable water retention device for a plant pot, which improves the aesthetics of a building.

A still further objective of this invention is the provision of an adjustable water retention device for a plant pot, which improves the air quality within a building.

These and other objectives of the invention (which other objectives become clear by consideration of the specification, claims and drawings as a whole) are met by providing an adjustable water retention device for a plant pot having a plant container nesting in a second outer pot, with a facilitated flow of water between the second outer pot and the plant container.

BRIEF DESCRIPTION OF THE DRAWINGS

FIG. 7 depicts a top perspective view of a circular plant pot 100 of this invention in first position 152.

FIG. 8 depicts a top perspective view of a circular plant pot 100 of this invention in last position 154.

FIG. 12 depicts a top plan view of a hexagonal plant pot 200 of this invention in first position 210.

FIG. 13 depicts a top plan view of a hexagonal plant pot 200 of this invention in first position 242.

FIG. 14 depicts a top plan view of a square plant pot 300 of this invention in first position 308.

FIG. 15 depicts a top plan view of a square plant pot 300 of this invention in first position 328.

Throughout the figures of the drawings, where the same part appears in more than one figure of the drawings, the same number is applied thereto.

DESCRIPTION OF THE PREFERRED EMBODIMENTS

Figure 1:
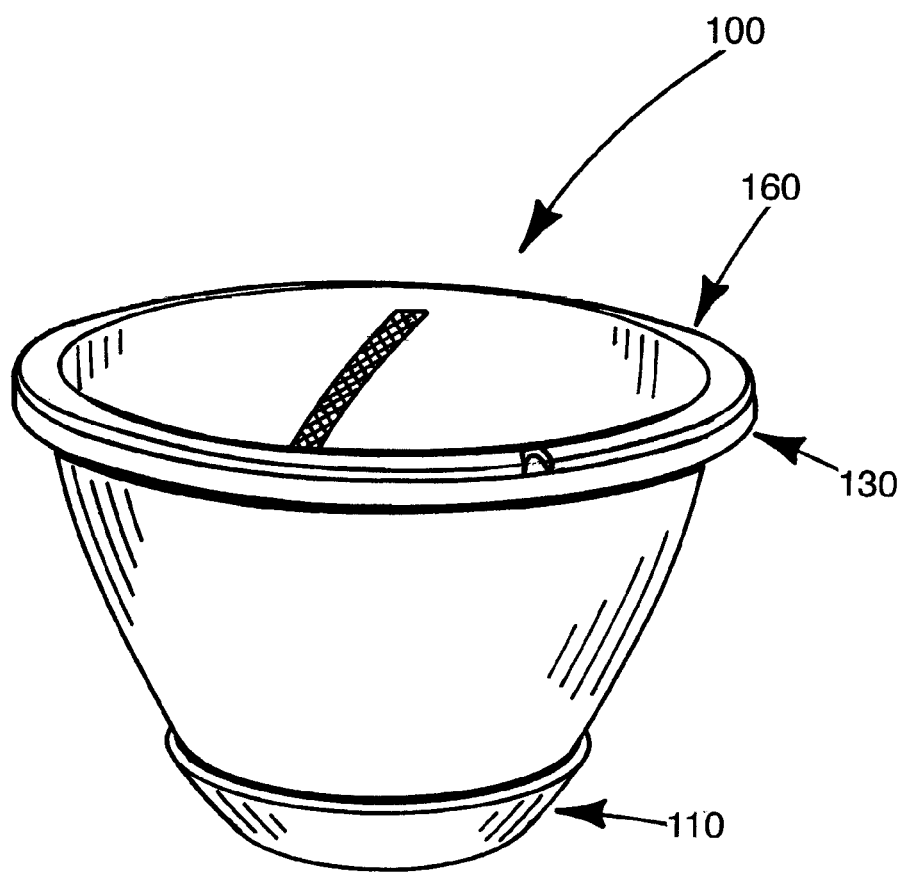
FIG. 1 depicts a perspective view of a circular plant pot 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

An adjustable water retention device for a plant pot of this invention has a base unit, a bowl or plant container, and a body unit or second outer pot. The base unit supports the body unit while the bowl is nestable in the body unit. The cooperating or interrelated structures of the body unit and the bowl permit water to be applied to a plant contained in the bowl as desired.

Watering of the plant contained in the adjustable water retention device for a plant pot is facilitated by a drain mechanism in the second outer pot, preferably on the inner surface thereof. The plant container includes an opening, such as a screen, to communicate with the drain mechanism. Any user of the adjustable water retention device for a plant pot may water the plant from the top in a standard fashion, such as by pouring water into the plant pot when it contains a plant and the soil therefor, and is assembled as a part of the adjustable water retention device for a plant pot. Such a structure permits a controlled graduated manner for watering a plant.

More specifically, the body unit has a vertical slot in the side. The vertical slot communicates with angled screen in the bowl and permits water to be applied at various levels of the soil in the plant. The base unit can collect excess water and permitted to be used in the plant.

Referring now to the drawings, the following references to specific drawing figures are intended to illustrate without unduly limiting the invention disclosed herein.

Figure 2:
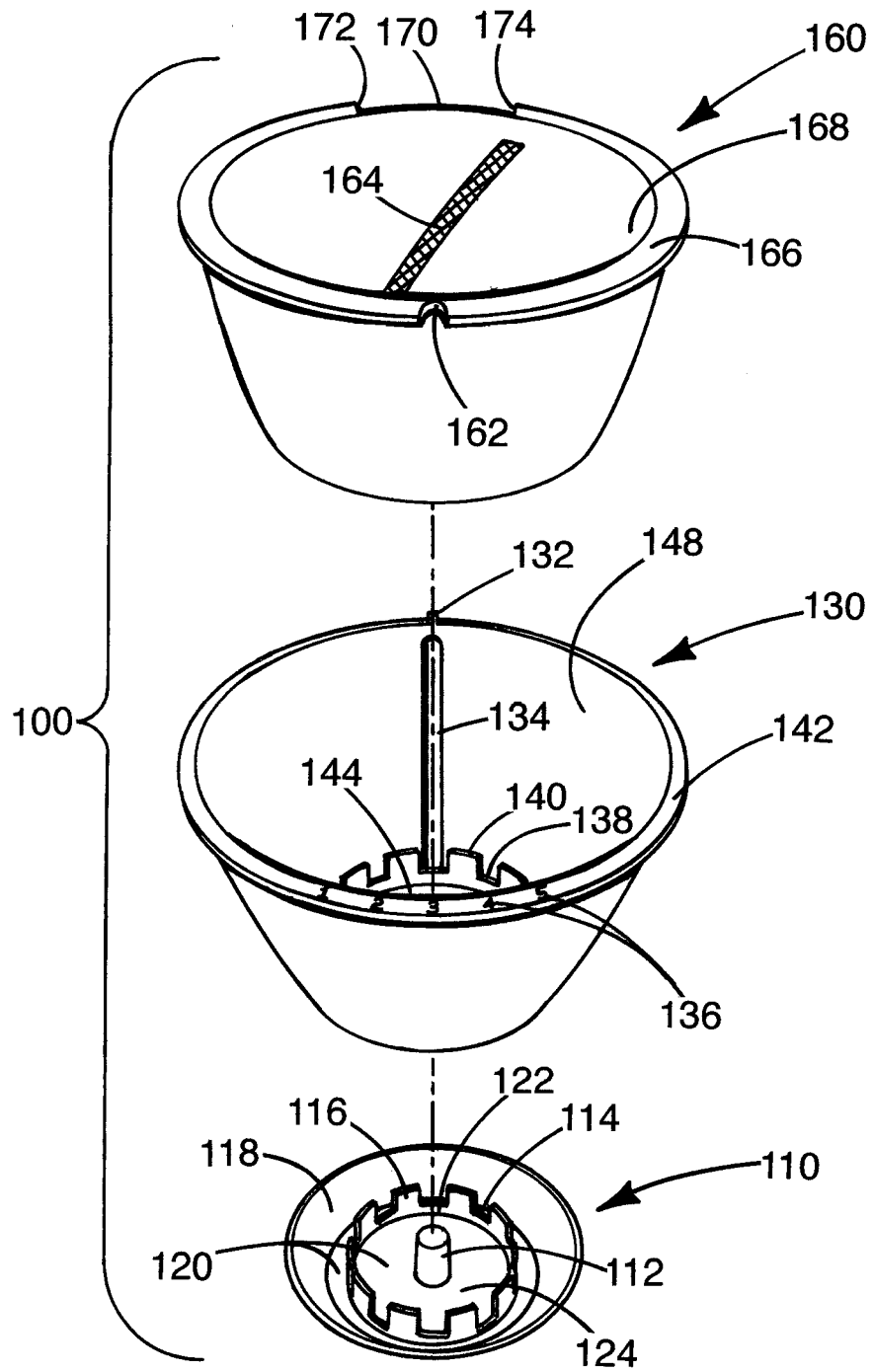
FIG. 2 depicts an exploded perspective view of a circular plant pot 100 of this invention.

Considering now FIG. 1 and FIG. 2, round plant pot 100 is one form of an adjustable water retention device for a plant pot and has a round base unit 110 supporting a round body unit 130. Nesting within the round body unit 130 is round plant bowl 160. Structures of the round base unit 110, round body unit 130, and round plant bowl 160 permit cooperation therebetween in the watering of the plant contained within round plant bowl 160.

Round base unit 110 includes a centrally located trunk 112 to receive round body unit 130. Base spill canal 114 surrounds the centrally located trunk 112 is separated therefrom by base fingers 116. Base fingers 116 protrude upwardly as does centrally located trunk 112. Base side 118 surrounds base fingers 116 putting base fingers 116 between base side 118 and centrally located trunk 112. Circular base bottom 120 supports centrally located trunk 112 and base fingers 116.

Base spill canal 114 provides a gap between base fingers 116 and permits water to flow between base fingers 116 to base side 118 of base bottom 120. Base dam 122, between base fingers 116 provide the base reservoir 124 between base fingers 116 and base trunk 112.

Figure 3:
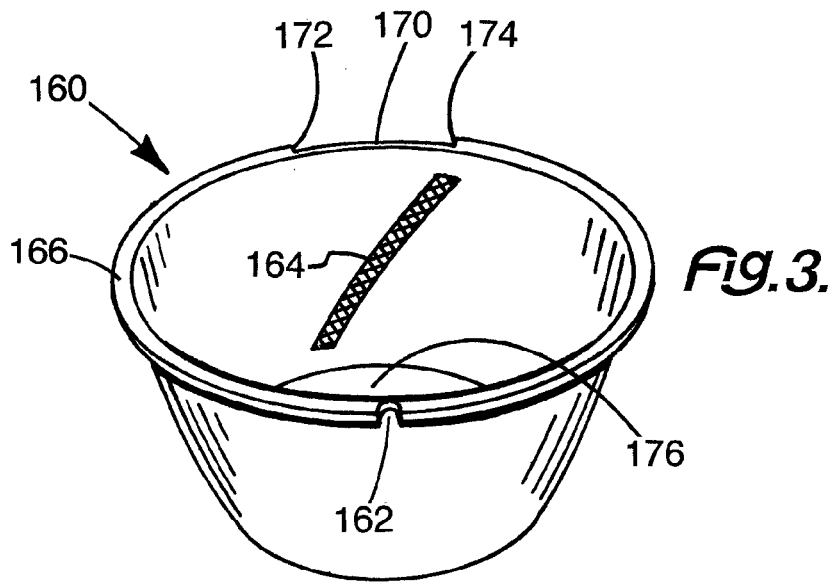
FIG. 3 depicts a top perspective view of a bowl 160 for a circular plant pot 100 of this invention.

Adding FIG. 3 to the consideration, round bowl 160 has a position notch 162 oppositely disposed from a filter screen 164. Position notch 162 is in lip plane 166 at the top edge of round bowl 160. Filter screen 164 is positioned in bowl side 168. Travel notch 170 is also in lip plane 166 and is oppositely disposed from position notch 162.

Travel notch 170 terminates at left stop 172 or right stop 174 and points in between to limit the movement of round bowl 160 and adjust water flow to the plant. Left stop 172 is oppositely disposed from right stop 174. Position notch 162 may be centrally located relative to travel notch 170 and other points in between left stop 172 and right stop 174. Bowl bottom 176 closes round bowl 160, in order to permit supporting of a plant therein.

Figure 4:
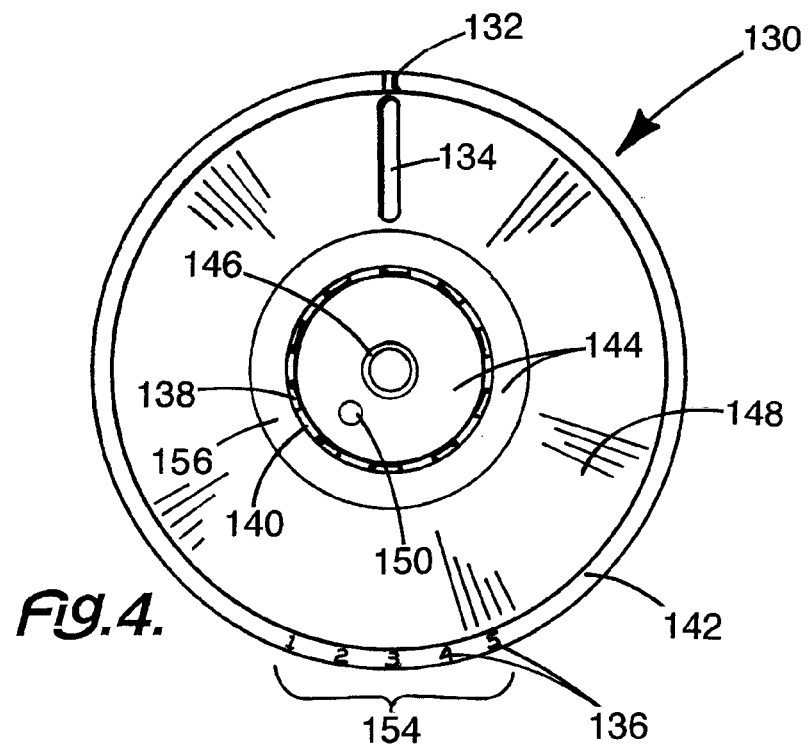
FIG. 4 depicts a top plan view of a body unit 130 for a circular plant pot 100 of this invention.
Figure 5:
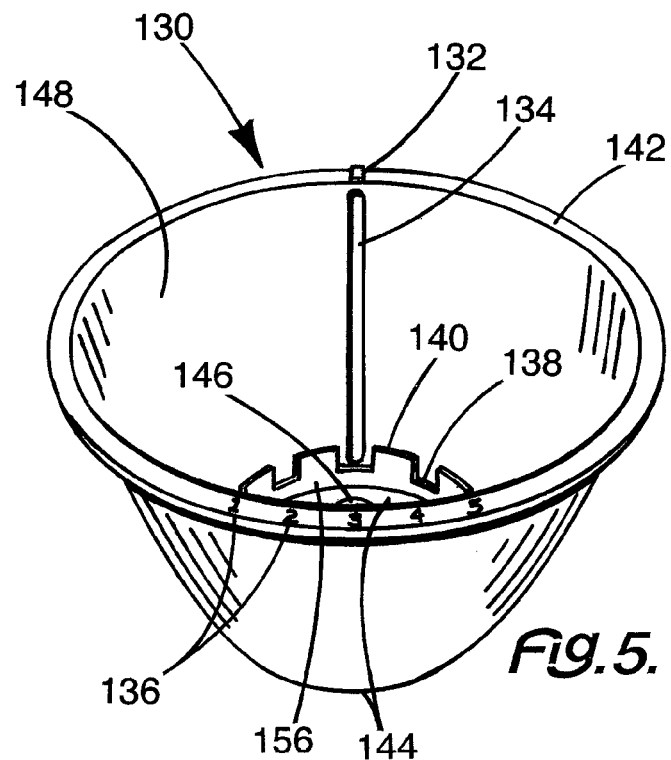
FIG. 5 depicts a top perspective view of a body unit 130 for a circular plant pot 100 of this invention.

With a further consideration of FIG. 4 and FIG. 5, the structure of round body unit 130 becomes clearer. Body unit 130 includes a travel stop 132 in a top edge thereof with water groove 134 therebelow. Opposite travel stop 132 are index numbers 136 to indicate position of round bowl 160.

In the bottom of round body unit 130 are body spill canals 138. Between each pair of body spill canals 138 is a body finger 140 for structure support. Oppositely disposed from the bottom of round body unit 130, is round lip 142. Within round lip 142 at top edge of round body unit 130 are the travel stop 132 with the index numbers 136 oppositely disposed therefrom.

Body bottom 144 includes cradle 146 to receive trunk 112 from round base 110. Body side 148 extends to connect body bottom 144 to round lip 142. Body bottom 144 includes a drain aperture 150 to permit water to flow from round base 110. Index numbers 136 determine first position 152 and last position 154 of round bowl 160 and points therebetween relative to round body unit 130.

Body dam 156 is formed by body spill canals 138 with the use of body fingers 140. Body reservoir 158 is formed between body side 148 and body bottom 144. Such structure permits the desired amount of water storage.

Figure 6:
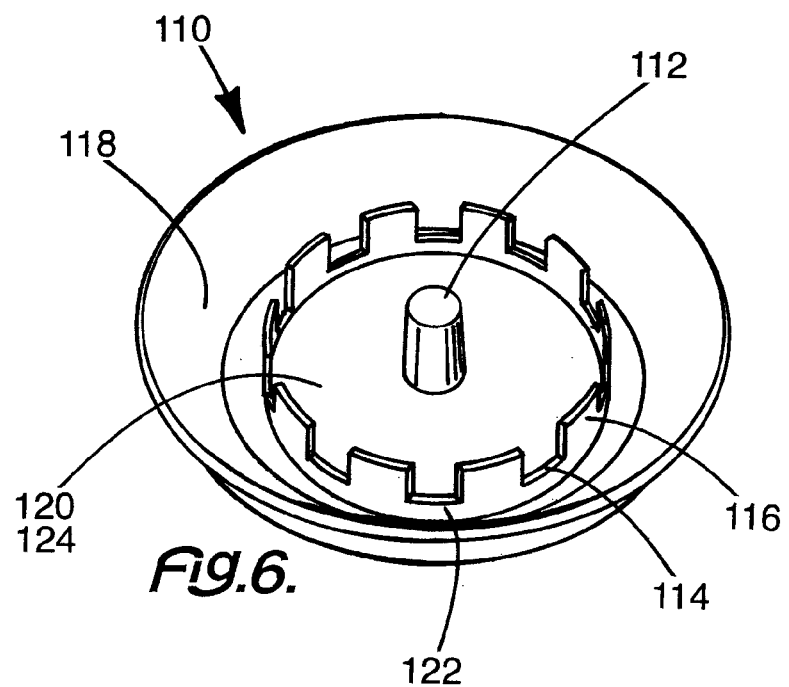
FIG. 6 depicts a top perspective view of a base unit 110 for a circular plant pot 100 of this invention.

FIG. 6 clarifies the structure of round base unit 110. Round base unit includes trunk 112 centrally located therein with base spill canals 114 separated by base fingers 116. Base side 118 extends upwardly from base bottom 120. Base dam 122 cooperates with base side 118 and base bottom 120 to form base reservoir 124.

In FIG. 7 and FIG. 8, the relationship of body unit 130 and round bowl 160, round plant pot 100 is depicted. Travel stop 132 of body unit 130 is shown in contact with left stop 172 of round bowl 164 for FIG. 7. Notch 152 thereby shows one of index numbers 136. FIG. 8, the other end of index number 136 is shown with travel stop 132 in contact with right stop 174. Furthermore, the relationship of water groove 134 and filter screen 164 are also shown.

Figure 9:
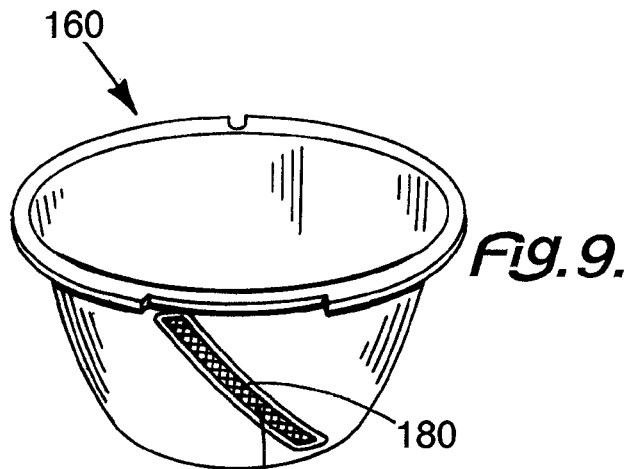
FIG. 9 depicts a top perspective view of a bowl 160 with a perimeter seal 180 for a circular plant pot 100 of this invention.
Figure 10:
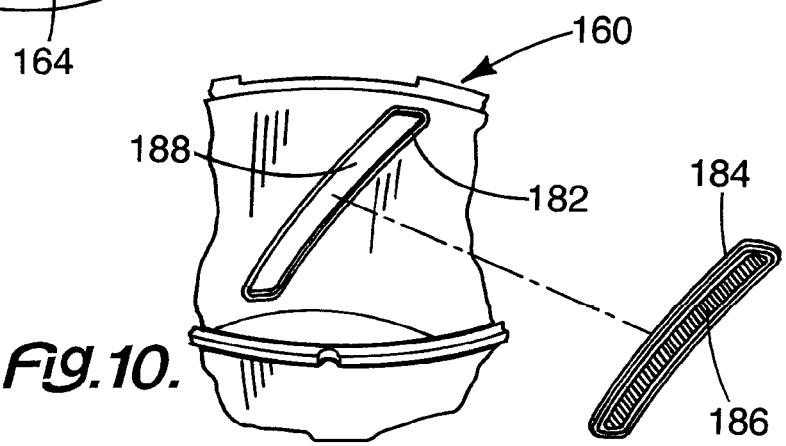
FIG. 10 depicts an exploded, top perspective view of a bowl 160 with removable screen insert 186 for a circular plant pot 100 of this invention.

With the addition of FIG. 9 and FIG. 10, permanent filter screen 164 is surrounded by a perimeter seal 180 on female snap rim 182. Male snap rim 184 surrounds screen insert 186 and permits screen insert 186 to fit into insert aperture 188.

Figure 11:
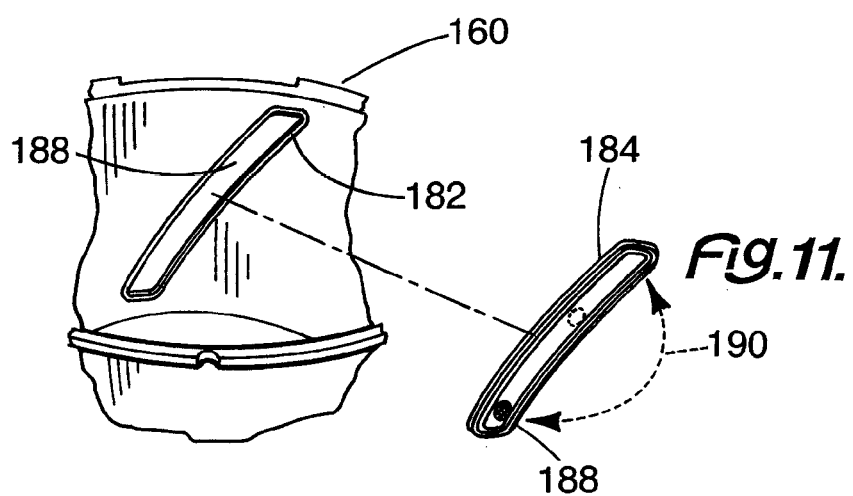
FIG. 11 depicts an exploded, top perspective view of a bowl 160 with flipable screen insert 190 for a circular plant pot 100 of this invention.

Turning now to FIG. 11, screen insert 186 is replaced with insert apertures 188 on flipable insert 190 on bowl 160. Flipable insert 190 can serve the same purpose as screen insert 186, changing parts becomes easier.

With FIG. 12 and FIG. 13 an adjustable water retention device for a plant pot is shown as hexagonal pot 200. Hexagonal pot 200 shows a possibility of having a suitable hexagonal shape with hexagonal container 202 receiving hexagonal plant holder 204 in a nestable fashion. On hexagonal container 202, is hexagonal position notch 206 to show hexagonal index numeral 208, depending on the side of the hexagon being used. Hexagonal first position 210 is positioned in hexagonal lip 212 with an index numeral 208 at each side. In hexagonal plant holder 204 is hexagonal position notch 206. Hexagonal water groove 218 contacts first screen aperture 230, second screen aperture 232, third screen aperture 234, fourth screen aperture 236, fifth screen aperture 238 or sixth screen aperture 240 depending on the position desired and considered with hexagonal position notch 242. So hexagonal first position 210 to hexagonal last position 244, and positions therebetween provide a variety of positions relative to the screen apertures.

Turning now to FIG. 14 and FIG. 15, an adjustable water retention device for a plant pot is shown as a square pot 290. Square pot 290 has outer square holder 292 with inner square holder 294 nesting therein. Square pot water groove 302 is positioned in outer square holder 292. The square pot position notch 306 displays square pot first position 308 with square pot lip 310 on outer square holder 292. The square pot position notch 306 is in the square pot lip plane 312. Within inner square holder 294 there is a screen aperture on each side thereof in the form of first screen aperture 320, second screen aperture 322, third screen aperture 324 and fourth screen aperture 326 at different heights to adjust the water. This accounts for the square pot first position 308 to square pot last position 328.

Figure 16:
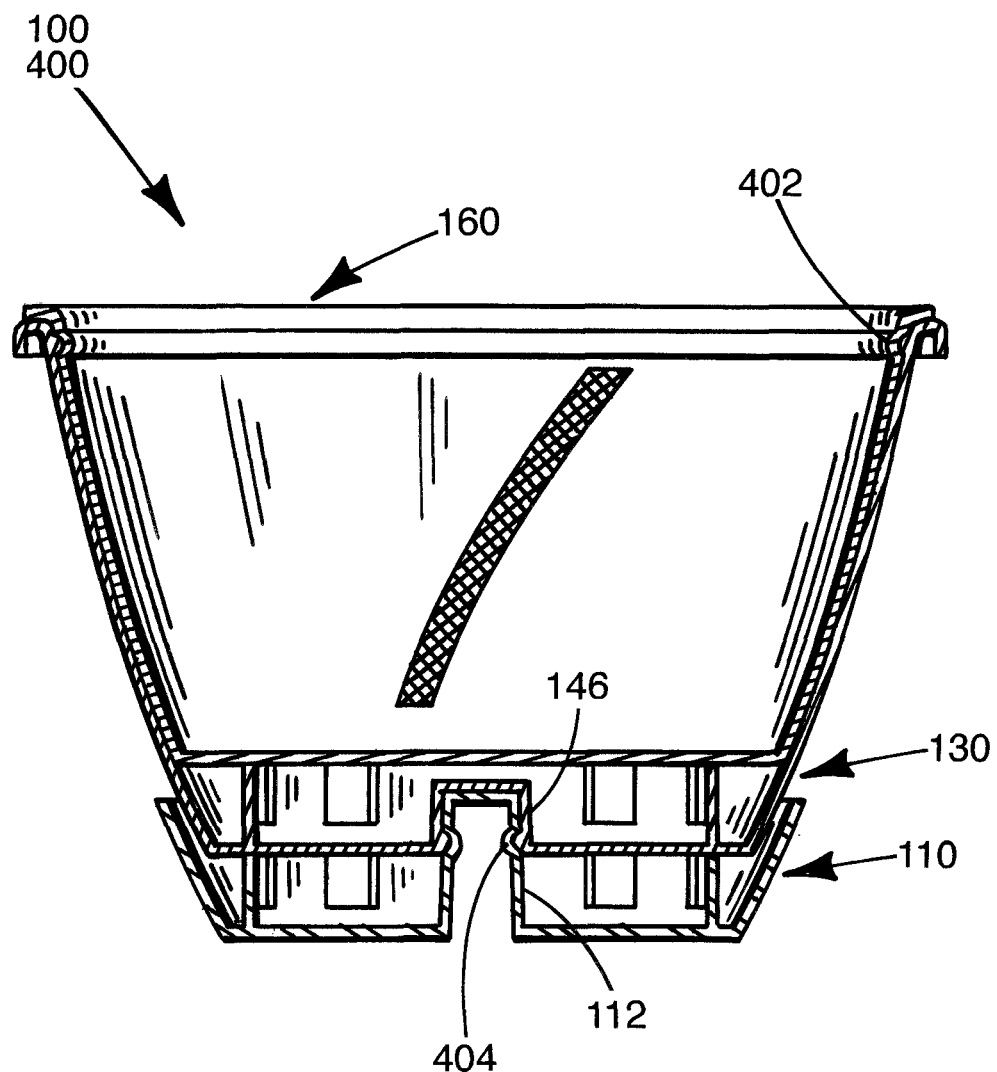
FIG. 16 depicts a side view of a circular plant pot 100 of this invention in partial cross section to show snap lock 400.

With FIG. 16, the feasibility of adding a snap lock assembly 400 to pot assembly 408 (FIG. 17) is seen. Pot assembly 408 can be circular plant pot 100 (FIG. 1), hexagonal plant pot 200 (FIG. 12), square plant pot 300 (FIG. 14) or any other desired shape for pot assembly 408. Snap lock 400 includes a top snap connection 402 added to centrally located trunk 112. Bottom snap connection 404 involves a modification of cradle 146. In this fashion, top snap connection 402 forms a male female connection with bottom snap connection 404.

Figure 17:
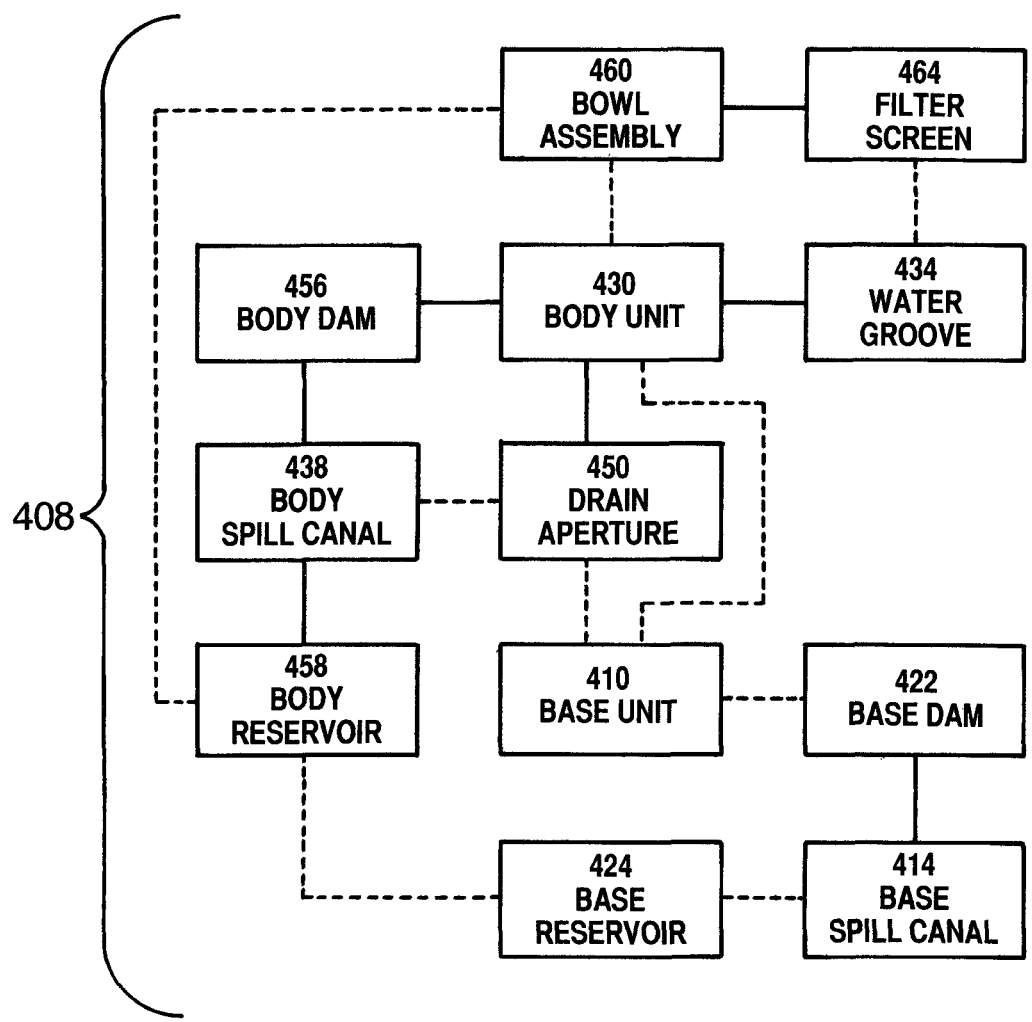
FIG. 17 depicts a box diagram for pot assembly 410 of this invention.

With FIG. 17, other variations of an adjustable water retention device for a plant pot beyond circular plant pot 100, hexagonal pot 200, or square pot 290 may be seen. Pot assembly 408 has an assembly base unit 410 communicating with a body unit 430. The body unit 430 is communicates with bowl 460. The base unit 410 feeds to assembly base dam 422. Assembly base dam 422 feeds to assembly base spill canal 414. Assembly base spill canal 414 feeds to assembly base reservoir 424. Assembly base reservoir 424 is connected to assembly bowl 460 through assembly body reservoir 458.

An assembly drain aperture 450 connects assembly base unit 410 to assembly body 430. Assembly bowl 460 is connected to assembly filter screen 464. Assembly filter screen 464 is connected to body unit 430 through water groove 434. Assembly body spill canal 438 is connected to assembly drain aperture 450, assembly body dam 456 and assembly body reservoir 458. Thus, pot assembly 408 may have any desired shape.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. An adjustable water retention device for a plant pot comprising:
    a) a plant container serving as a first pot and nesting in a second pot;
    b) the second pot and the plant container communicating in order to provide a facilitated flow of water between the second pot and the plant container;
    c) the facilitated flow of water being adjustable;
    d) a base unit supporting the second pot;
    e) the second pot supporting the plant container;
    f) the second pot having a drain mechanism in the second pot;
    g) the plant container including an opening through which water may pass to communicate with the drain mechanism;
    h) the opening including a screen mounted therein;
    i) the drain mechanism being situated on an inner surface of the second pot;
    j) the screen communicating with the drain mechanism; and
    k) the screen being adjustable relative to the drain mechanism.

2. The adjustable water retention device for a plant pot of claim 1 further comprising:
    a) the adjustable water retention device for a plant pot providing for water to be fed to a plant from a top of the plant container;
    b) the drain mechanism being a vertical slot in the second pot;
    c) the vertical slot communicating with the screen;
    d) the screen being on an angle relative to the vertical slot; and
    e) the vertical slot and the screen permitting water to be applied at various levels of the soil in the plant.

3. The adjustable water retention device for a plant pot of claim 2 further comprising:
    a) the second pot and the plant container being round; and
    b) the plant container nesting within the second pot to form the plant pot.

4. The adjustable water retention device for a plant pot of claim 3 further comprising:
    a) the second pot and the plant container cooperating to water a plant contained within the plant container;
    b) the second pot including a centrally located trunk to receive the plant container;
    c) a base spill canal surrounding the centrally located trunk;
    d) the base spill canal being separated from the centrally located trunk by base fingers;
    e) the base fingers protruding upwardly as does the centrally located trunk;
    f) a base side surrounding the base fingers;
    g) the base fingers being situated between the base side and the centrally located trunk; and
    h) the round base having a circular base bottom to support the centrally located trunk and the base fingers.

5. The adjustable water retention device for a plant pot of claim 4 further comprising:
    a) the base spill canal providing a gap between the base fingers to permit water flow between the base fingers to the base side of the base bottom;
    b) the base dam being between the base fingers to provide the base reservoir between the base fingers and the base trunk;
    c) the round bowl having a lip plane at a top edge thereof; and
    d) the lip plane having a position notch oppositely disposed from a travel notch.

6. The adjustable water retention device for a plant pot of claim 5 further comprising:
    a) the screen being a filter screen being positioned in a side of the plant bowl; and
    b) a bowl bottom closing the plant bowl in order to permit supporting of a plant therein.

7. The adjustable water retention device for a plant pot of claim 6 further comprising:
    a) at least two index numbers being on the rim opposite the travel groove;
    b) a travel stop being positioned in the rim opposite the position notch;
    c) the water groove being below the travel stop;
    d) at least two body spill canals being situated in a bottom of the round body unit;
    e) a body finger being positioned between each pair of body spill canals;
    f) a round lip being oppositely disposed from a bottom and at top edge of the round body unit; and
    g) the round lip including the travel stop with the at least two index numbers oppositely disposed therefrom.

8. The adjustable water retention device for a plant pot of claim 7 further comprising:

a) the body bottom including a cradle to receive the trunk from the round base;
b) the body side connecting the body bottom to the round lip;
c) the body bottom including a drain aperture to permit water to flow from the round base;
d) a body dam being formed by the body spill canal with the body finger;
e) a body reservoir for water being formed between the body side and the body bottom to permit of water storage;
f) the round base unit including the trunk centrally located therein with the base spill canals separated by the base fingers;
g) the base side extending upwardly from the base bottom; and
h) the base dam cooperating with the base side and the base bottom to form the base reservoir.

9. The adjustable water retention device for a plant pot of claim 8 further comprising:
a) the travel stop of the body unit being adapted to contact the left stop or the right stop of the round bowl;
b) the notch being adapted to show one of the at least two index numbers;
c) the opening being selected from the group consisting of a permanent filter screen, a perimeter seal for a female snap rim and a male snap rim surrounding a screen to fit into an insert aperture, and a flipable insert.

10. The adjustable water retention device for a plant pot of claim 1 further comprising:
a) a snap lock assembly being added to the adjustable water retention device for a plant pot;
b) the snap lock including a top snap connection;
c) the top snap connection being added to a centrally located trunk;
d) a bottom snap connection on a cradle cooperating with the top snap in a male to female relationship.

11. An adjustable water retention device for a plant pot comprising:
a) a plant container serving as a first pot and nesting in a second pot;
b) the second pot and the plant container communicating in order to provide a facilitated flow of water between the second pot and the plant container;
c) the facilitated flow of water being adjustable;
d) a base unit supporting the pot;
e) the second pot supporting the plant pot;
f) the second pot having a drain mechanism in the second pot;
g) the plant container including an opening through which water may pass to communicate with the drain mechanism;
h) the plant container and the second pot having a hexagonal shape;
i) the second pot having the hexagonal shape receiving the plant container having a hexagonal shape in a nestable fashion;
j) the plant container having a hexagonal shape further having a hexagonal position notch to show at least one hexagonal index numeral, depending on a side of the hexagonal container being used;
k) a hexagonal water groove contacting a first screen aperture, a second screen aperture, a third screen aperture, a fourth screen aperture, a fifth screen aperture or a sixth screen aperture as desired; and
l) the first screen aperture, the second screen aperture, the third screen aperture, the fourth screen aperture, the fifth screen aperture and the sixth screen aperture having different positions relative to the hexagonal water in order to contact the hexagonal water groove at levels and provide water to a plant contained in the plant container having a hexagonal shape at a desired point.

12. An adjustable water retention device for a plant pot comprising:
a) a plant container serving as a first not and nesting in a second pot;
b) the second pot and the plant container communicating in order to provide a facilitated flow of water between the second pot and the plant container;
c) the facilitated flow of water being adjustable;
d) a base unit supporting the pot;
e) the second pot supporting the plant pot;
f) the second pot having a drain mechanism in the second pot;
g) the plant container including an opening through which water may pass to communicate with the drain mechanism;
h) the plant container being a square plant container;
i) the second pot being a square outer pot;
j) the square plant container being nestable within the square outer pot;
k) a square pot water groove being positioned in the square outer pot;
l) a square pot position notch in the square plant container displaying a square pot first position with a square pot lip on the square outer pot;
m) the square pot position notch being positioned in a square pot lip plane within the square plant container; and
n) the square plant container having a screen aperture on each side as a first screen aperture, a second screen aperture, a third screen aperture and a fourth screen aperture at different heights to adjust a water flow.

13. An adjustable water retention device for a plant pot comprising:
a) a pot assembly for the adjustable water retention device for a plant pot;
b) the pot assembly having an assembly base unit, a bowl, and a body unit;
c) the assembly base unit communicating with the body unit;
d) the body unit communicating with the bowl;
e) the base unit feeding to an assembly base dam;
f) the assembly base dam feeding to an assembly base spill canal;
g) the assembly base spill canal feeding to the assembly base reservoir;
h) the assembly base reservoir being connected to the assembly bowl through the assembly body reservoir;
i) an assembly drain aperture connecting the assembly base unit to the assembly body;
j) the assembly bowl being connected to an assembly filter screen;
k) the assembly filter screen being connected to the body unit through the water groove; and
l) the assembly body spill canal being connected to the assembly drain aperture, an assembly body dam and an assembly body reservoir.

14. The adjustable water retention device for a plant pot of claim 13 further comprising the adjustable water retention device for a plant pot having an opening in the bowl, the opening receiving a device selected from the group consisting of a permanent filter screen, a perimeter seal for a female snap rim and a male snap rim surrounding a screen to fit into an insert aperture, and a flipable insert.

16. The adjustable water retention device for a plant pot of claim 13 further comprising the adjustable water retention device for a plant pot being circular.

16. The adjustable water retention device for a plant pot of claim 13 further comprising the adjustable water retention device for a plant pot being hexagonal.

17. The adjustable water retention device for a plant pot of claim 13 further comprising the adjustable water retention device for a plant pot being square.

* * * * *